H. G. THOMPSON & B. F. BERGH.
TACKING MACHINES FOR BOOTS AND SHOES.
No. 7,047. Reissued April 11, 1876.
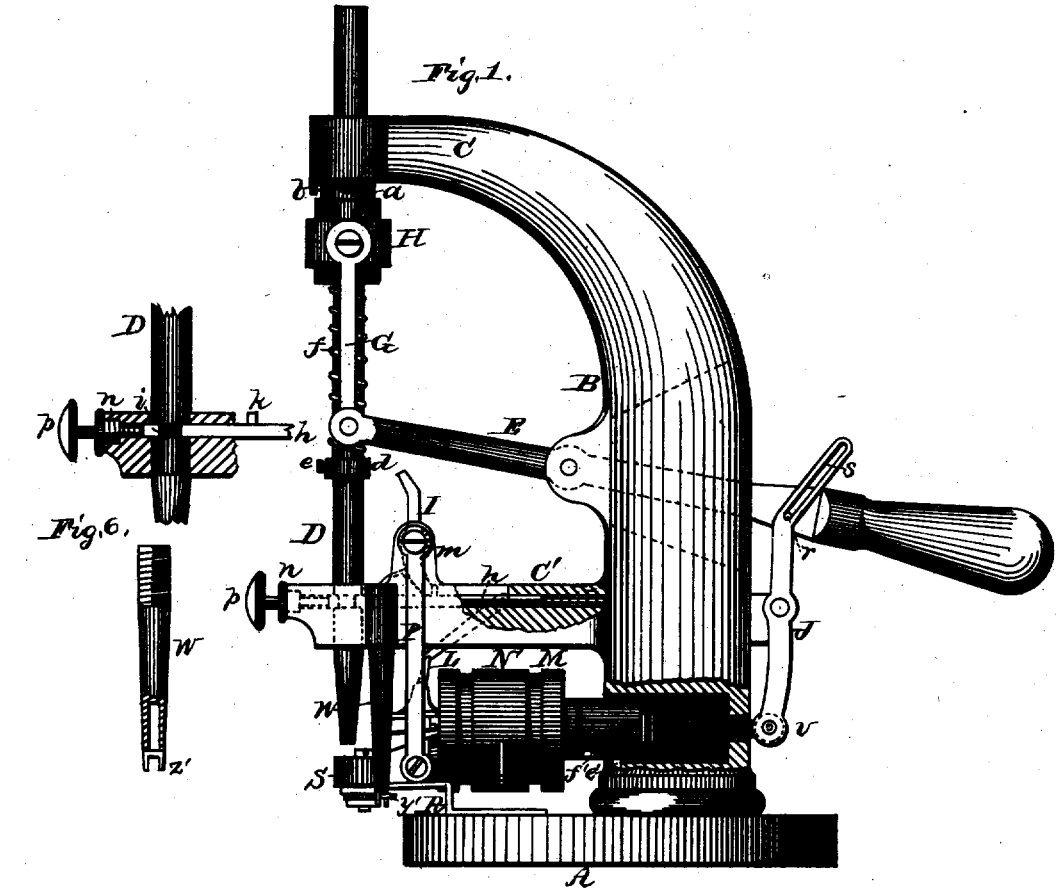
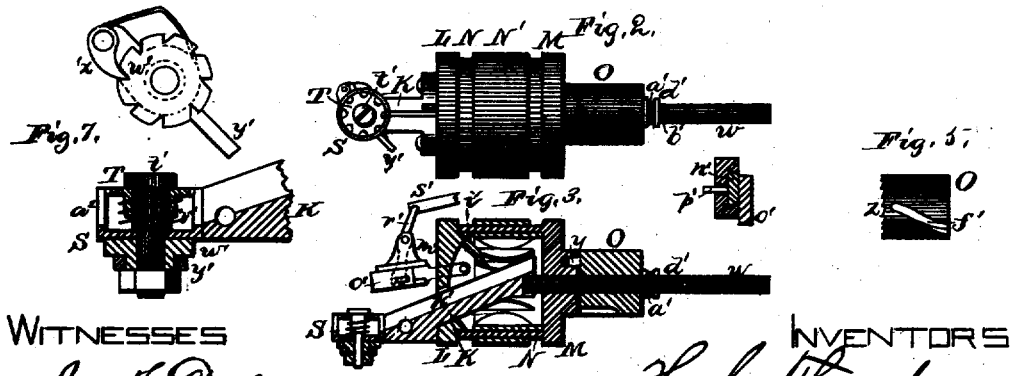
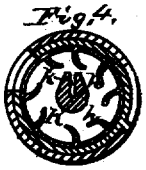
WITNESSES
Jas. F. Duhamel
Thomas. Byrne.
INVENTORS
H. G. Thompson
Benj. F. Bergh.
PER
N. S. Abbot.
ATTORNEY.
M. PETERS, PHOTO-LITHOGRAPHER, WASHINGTON, D. C.

UNITED STATES PATENT OFFICE.

HENRY G. THOMPSON AND BROR F. BERGH, OF MILFORD, CONNECTICUT; SAID BERGH ASSIGNOR TO SAID THOMPSON.

IMPROVEMENT IN TACKING-MACHINES FOR BOOTS AND SHOES.

Specification forming part of Letters Patent No. 152,927, dated July 14, 1874; reissue No 7,047, dated April 11, 1876; application filed November 4, 1875.

*To all whom it may concern:*

Be it known that we, HENRY G. THOMPSON and BROR F. BERGH, of Milford, in the county of New Haven and State of Connecticut, have invented certain new and useful Improvements in Tacking-Machine for Boots and Shoes, of which the following is a specification:

Our invention relates to machines for driving tacks through the uppers or vamps of boots and shoes into the inner soles thereof; and the nature of our invention consists in a feeding-cylinder revolved by means of a ratchet movement; also, in the combination of ratchet for turning and cam for moving the feed-cylinder to and from the hammer; also, in a revolving feeding-cylinder, in which the front head thereof is stationary; also, in a vibrating or reciprocating incline or roadway in the feeding-cylinder. It also consists in an apron fastened to the stationary head on the inside of the feeding-cylinder for the purpose of filling the incline with tacks as the cylinder rotates; also, in a feed device for pushing the tacks from the incline outside of the cylinder into recesses in the index-wheel of the distributing-cylinder; also, in a distributing-cylinder for separating, holding, and delivering the tacks under the hammer; also, in a device for increasing or decreasing the force of the blow given by the hammer; also, in a lock for locking the hammer, and in a cam for unlocking the same.

Our invention further consists in the general combination and arrangement of parts, as will be hereinafter more fully set forth.

In order to enable others skilled in the art to which our invention appertains to make and use the same, we will now proceed to describe its construction and operation, referring to the annexed drawing, which forms a part of this specification, and in which—

Figure 1 is a side elevation, partly in section, of a tacking-machine embodying our invention. Fig. 2 is a plan view of the revolving cylinder, with incline and distributing cylinder. Fig. 3 is a longitudinal section of the same through the line *x x*, Fig. 2. Fig. 4 is a transverse section of the feeding-cylinder through the line *y y*, Fig. 2. Fig. 5 shows the ratchet device for revolving the feed-cylinder. Fig. 6 shows the locking device for the hammers. Fig. 7 shows the distributing-cylinder, with the rachet for operating the same.

A represents the base of our machine, from which rises a post or standard, B. The upper end of this post is curved forward, forming the upper arm, C, and a horizontal arm, C′, extends from the post a suitable distance above the base A. Through the front or outer ends of the arms C C′ passes the vertical hammer D which drives the tacks into their places. This hammer is operated by a lever, E, which passes through, and is pivoted in the post or standard B at a suitable point between the arms C C′. This lever E also operates the other parts, as will be hereinafter described, and is itself operated by any suitable power with which it is to be connected. The front end of the lever is forked, and the end of each prong is, by a rod or bar, G, connected with a sleeve, H, placed loosely on the hammer D. Above this sleeve on the hammer is an adjustable collar, *a*, secured by means of a set-screw, *b*. A suitable distance below the sleeve H is another adjustable collar, *d*, secured by means of a set-screw, *e*, and between this latter collar and the sleeve is placed a spiral spring, *f*, surrounding the hammer. The spring *f* throws the hammer down at the proper time, and, by adjusting the bottom collar *d*, the tension of the spring *f* is easily regulated so as to cause the hammer to give a stronger or lighter blow, as may be required for the particular kind of work being done. On the hammer D is a circumferential groove, *i*, at such a point that when the hammer is raised as far as can be by the lever E, the upper collar *a* having first been properly adjusted, said groove will be within the arm C′, and directly opposite to a spring-bolt, *h*, arranged within said arm, which bolt then springs into said groove, and supports the hammer in its elevated position independent of the lever. On the upper side of the bolt *h* is a lug or projection, *k*, as shown particularly in Fig. 6, against the front side of which the lower end of a cam-lever, I, is to work, said lever being pivoted between two ears, *m*, on the upper side of the arm C′, and the lower end of said lever projecting through an elongated slot into the arm. The hammer having been raised by the downward movement of the outer or rear end of the lever E, and caught by the spring-bolt *h*, the rear end of the lever is moved upward again, when the hammer remains stationary, and the spring *f* is compressed by the downward movement of the sleeve H, caused by the downward motion of the front end of the lever until said forked front end of the lever strikes the upper end of the cam-lever I, when this latter lever is thereby turned on its pivot, and pushes the spring-bolt *h* back, so as to release the hammer and allow the compressed spring *f* to throw the hammer down. This operation is continued for every stroke of the lever E.

In the front end of the arm C′ is screwed a hollow screw, *n*, through which passes a spring-bolt, *p*, to enter the groove *i* on the hammer, and hold the same stationary independent of the bolt *h* just described. The bolt *p* is to be used in setting the hammer and regulating the spring *f*. Through the lever *e*, at a suitable point back of the standard B, passes a pin, *r*, which pin passes through inclined or cam slots *s s* in the upper ends of two levers, J J, pivoted to a projection on the back of said standard, and extending up one on each side of the lever E. In the lower ends of the levers J J is hung a nut, *v*, upon journals, and in the same is screwed a rod, *w*. This rod *w* passes forward through a hole in the back of the post B, and into a recess made in the same, from the front backward, and the front end of the rod is made fast in the rear end of an inclined bar, K, which passes through and is permanently attached to the front head L of the feeding-cylinder. The feeding-cylinder consists of this front head L, a rear head, M, and the cylindrical body or shell N. The body or shell N and the rear head M are either made in one piece or permanently united together; and on the rear face of the front head L is a circular shoulder or offset, *x*, over which the front end of the shell N fits, but is not attached thereto, so that the rear head and shell of the feeding-cylinder may be revolved while the front head remains stationary. On the back of the rear head M is formed a hub, in which is inserted a spring-pawl, *y*. This pawl engages with ratchet-teeth *z* formed upon the front end of a sleeve, O, which is placed upon the rod *w*, and held against the hub on the head M by means of a rubber or other spring, $a^1$, between two washers, *d′*, on the rod *w*, and these held by a pin, *b′*, passing through said rod. In the under side of the sleeve O is a spiral groove, *f′*, into which enters a pin or lug, *e′*, projecting upward from the bottom of the recess in the post or standard B.

As the lever E is moved down the pin *r*, passing downward in the cam-slots *s*, forces the lower ends of the levers J J forward, carrying the rod *w* and entire feeding-cylinder forward. This forward motion turns the ratchet-sleeve O around backward a short distance by means of the lug *e′* and spiral groove *f′*, and as the lever E is raised the feeding-cylinder is drawn back by the levers J J; and during this movement the ratchet-sleeve O is revolved in the opposite direction, thereby rotating the part M N of the feeding-cylinder This rotation of the cylinder is for the purpose of carrying up the tacks contained therein, which is done by means of wings or buckets *h′* attached to the inner side of the shell N. These wings or buckets carry up the tacks and deposit them on an apron, *i′*, attached on the inner side of the stationary head L, which apron fills a longitudinal groove, *k′*, in the incline K with tacks, and prevents obstructions as the tacks pass down said incline through the cylinder-head. The inclined grooved bar K, which is attached to the stationary head L, extends a suitable distance in front thereof, and has a bar or rod, P, pivoted to it on each side, and the upper ends of said bars or rods are pivoted to the ears *m m* on the arm C′ by the same bolt which pivots the cam-lever I, and thus supports the front part of the entire feeding mechanism. To further support the same, and prevent undue strain on the pivot-bolts, the heads of the bolts which pivot the rods P to the incline K rest and move upon guides R attached to the base A, said guides also directing the backward and forward movement of the inclined roadway and of the entire feeding mechanism. Through a slot in the head L passes a bar, *m′*, the inner end of which is pivoted to said head, and the outer portion is provided with a dovetailed groove, in which is placed a slide, *n′*, and to this slide is attached a piece, *o′*, of leather or other suitable material, that is directly above the channel *k′* in the incline K. The slide *n′* is provided on its rear side with a pin, *p′*, projecting through a slot in the bar *m′*, and over said pin is placed the forked lower end of a lever, *r′*, which is pivoted to a projection upon the bar *m′*, and its upper end, by a rod, *s′*, connected with the arm C′ of the main frame.

This constitutes the device for feeding the tacks from the incline by a parallel motion to the distributing-cylinder, and it operates as follows: At the moment when the feeding-cylinder commences its backward movement the feeding device is in the position shown in Fig. 3, and during the backward movement the slide *n′*, with the leather *o′*, is moved backward in the grooved arm *m′*, and as the feeding-cylinder completes its backward movement, the feeding device descends, until the leather *o′* rests upon the heads of the tacks in the channel *k′*. Then, during the forward movement of the feeding-cylinder the leather *o′* and the slide *n′* moves forward parallel with the incline, and move or feed one tack into the distributing-cylinder, and as the forward movement of the feeding-cylinder is completed the feeding device ascends to its original position.

S represents the vertical feeding-cylinder, attached to or formed on the front end of the incline K. This cylinder is open at the top, and therein is inserted a horizontal index-plate, T, having notches in its edge at regular intervals, as shown in Fig. 2. The index-plate T is held by a central bolt, $t'$, and supported by a spring, $v'$, as shown in Fig. 7, the bolt being so made that the index-plate must revolve with it. Upon the bolt $t'$, below the cylinder S, is firmly secured a ratchet-wheel, $w'$, into which takes a spring-pawl, $x'$. This pawl is pivoted upon one end of a lever, $y'$, which is placed loosely upon the hub of the ratchet-wheel, and its other end held in a forked pin, $z^1$, which is placed loosely in the lower hollow end of a post, W, screwed into the arm C′ of the main frame.

It will readily be seen that by the movement back and forth of the entire feeding apparatus the ratchet $w'$ $x'$ is operated, and it turns the index-plate T during the forward movement of the feeding apparatus, so as to bring one notch in position against the tack-channel $k'$, and another notch with a tack therein opposite a slot, $a^2$, in the front of the distributing-cylinder.

If a magnetized hammer is used the tack thus brought opposite the slot $a^2$ will be at once attracted to the end thereof; but if any other hammer is used, some suitable device will be employed to take the tack from the distributing-cylinder.

The shell N of the feeding-cylinder is provided with a suitable aperture for the admission of the tacks, which aperture may be closed by means of a band, N′, encircling said shell, and which band has a corresponding aperture, as shown in Fig. 4.

Having thus fully described our invention, what we claim as new, and desire to secure by Letters Patent, is—

1. The combination, with a tack-driving mechanism, of the feed-cylinder M, revolved by means of a ratchet movement, substantially as herein set forth.

2. In a tack-driving machine, employing a hammer for driving the tacks, the combination of a ratchet for rotating, and cam for vibrating, the feed-cylinder, provided with a stationary head, substantially as herein set forth.

3. In a tack-driving machine, a revolving feed-cylinder, provided with a stationary head at its front end, substantially as herein set forth.

4. In a tack-driving machine, an inclined roadway, having an intermittent reciprocating motion, in combination with a feed-cylinder, having a stationary head, substantially as shown and described.

5. The combination of the stationary head L, with incline K, revolving head M and shell N, ratchet device O $y$ $z$, rod $w$, and cam levers J J, all constructed substantially as and for the purposes herein set forth.

6. The apron $i'$, attached to the inner side of the stationary head L, of the revolving feed-cylinder, for the purposes herein set forth.

7. In combination with the incline K, having the tack-channel $k'$, a feeding mechanism having a motion parallel thereto, substantially as herein set forth.

8. The combination of the bar $m'$, slide $n'$, with leather $o'$ and pin $p'$, the forked lever $r'$, and connecting-rod $s'$, substantially as and for the purposes herein set forth.

9. In a tack-driving machine, the combination, with a revolving feeding-cylinder, of a distributing-cylinder for separating, holding, and delivering the tacks under the hammer, substantially as herein set forth.

10. The combination, in a tack-driving machine, of a distributing-cylinder, operated by a ratchet-movement, and a parallel feed motion, substantially as herein set forth.

11. The combination, with the hammer D, having circumferential groove $i$, of the sleeve H, spring $f$, and adjustable collar $d$, for the purposes herein set forth.

12. The spring-bolt $h$, in combination with the circumferential groove $i$ in the hammer D, for the purposes herein set forth.

13. The combination, with the spring-bolt $h$, of the cam-lever I, and operating lever E, substantially as and for the purposes herein set forth.

In testimony that we claim the foregoing we have hereunto set our hands this 1st day of October, 1875.

HENRY G. THOMPSON.
B. F. BERGH.

Witnesses:
F. L. ALLIS,
WINSLOW WARREN.